US012677767B2

(12) United States Patent
Yoo

(10) Patent No.: US 12,677,767 B2
(45) Date of Patent: Jul. 14, 2026

(54) PLANT CULTIVATION APPARATUS AND CONTROL METHOD FOR SAME

(71) Applicant: LG ELECTRONICS INC., Seoul (KR)

(72) Inventor: Imsung Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/714,228

(22) PCT Filed: Nov. 29, 2022

(86) PCT No.: PCT/KR2022/019073
§ 371 (c)(1),
(2) Date: May 29, 2024

(87) PCT Pub. No.: WO2023/096460
PCT Pub. Date: Jun. 1, 2023

(65) Prior Publication Data
US 2024/0389527 A1     Nov. 28, 2024

(30) Foreign Application Priority Data
Nov. 29, 2021     (KR) ......................... 10-2021-0167255

(51) Int. Cl.
*A01G 31/06*     (2006.01)
*A01G 27/00*     (2006.01)
(52) U.S. Cl.
CPC ........... *A01G 31/06* (2013.01); *A01G 27/003* (2013.01)
(58) Field of Classification Search
CPC ..................................................... A01G 31/06
See application file for complete search history.

(56) References Cited

U.S. PATENT DOCUMENTS 10,552,951 B2 * 2/2020 Barrasso .................. A01G 7/00
10,750,689 B2 * 8/2020 Olesen ................. A01G 27/001
(Continued)

FOREIGN PATENT DOCUMENTS

KR          10-1090279          12/2011
KR     10-2014-0071774          6/2014
(Continued)

OTHER PUBLICATIONS

International Search Report dated Mar. 17, 2023 issued in Application No. PCT/KR2022/019073.

*Primary Examiner* — Magdalena Topolski
*Assistant Examiner* — Katherine Anne Kloecker
(74) *Attorney, Agent, or Firm* — KED & ASSOCIATES, LLP

(57)          ABSTRACT

A plant cultivation apparatus includes a cabinet; a mixing tank provided inside the cabinet to store a nutrient solution provided to plants by mixing water and nutrients; a concentration detection unit provided inside the cabinet to measure the concentration of nutrients in the nutrient solution; a mixing tank water level detection unit provided in the mixing tank to measure the level of the nutrient solution; and a control unit configured to determine expected concentration in a state in which water is added to a difference between the level of the nutrient solution and an upper limit level, based on the concentration of the nutrient solution when the level of the nutrient solution is less than the upper limit level of the mixing tank, and to perform a draining the nutrient solution from the mixing tank when the expected concentration is at the upper limit or more.

27 Claims, 11 Drawing Sheets

(56)                         References Cited

U.S. PATENT DOCUMENTS

| | | | | |
|---|---|---|---|---|
| 11,452,270 | B2 * | 9/2022 | Caselli ...................... | C02F 1/66 |
| 11,825,785 | B2 * | 11/2023 | Hatran ................... | A01G 9/246 |
| 11,937,564 | B2 * | 3/2024 | Massey ................... | A01G 9/26 |
| 2015/0000190 | A1 * | 1/2015 | Gibbons ................ | A01G 31/02 |
| | | | | 47/79 |
| 2015/0027548 | A1 * | 1/2015 | Moriarty ............... | A01G 31/02 |
| | | | | 137/557 |
| 2018/0308028 | A1 * | 10/2018 | Zhang ................... | A01G 31/02 |
| 2020/0323157 | A1 * | 10/2020 | English ................... | A01G 7/00 |
| 2021/0144942 | A1 | 5/2021 | Ofir et al. | |
| 2022/0087120 | A1 * | 3/2022 | Singer ................... | A01G 9/246 |

FOREIGN PATENT DOCUMENTS

| | | | | | |
|---|---|---|---|---|---|
| KR | 10-2015-0057641 | | 5/2015 | | |
| KR | 10-2016-0105109 | | 9/2016 | | |
| KR | 101932880 | B1 * | 12/2018 | ............ | A01G 31/02 |
| KR | 20200063317 | A * | 6/2020 | ............ | A01G 31/00 |
| KR | 10-2020-0100496 | | 8/2020 | | |
| KR | 102162817 | B1 * | 10/2020 | | |

* cited by examiner

| Concentration | Water level | Drain process | Water supply process | Nutrient supply process |
|---|---|---|---|---|
| Upper limit concentration or more | Upper limit water level or more | 0 | 0 | – |
| | Less than upper limit water level , and lower limit water level or more | – | 0 | – |
| | Less than lower limit water level | – | 0 | – |
| Less than upper limit concentration, and lower limit concentration or more | Upper limit water level or more | – | – | – |
| | Less than upper limit water level , and lower limit water level or more | – | – | – |
| | Less than lower limit water level | 0 | 0 | – |
| Less than lower limit concentration | Upper limit water level or more | 0 | – | 0 |
| | Less than upper limit water level , and lower limit water level or more | – | – | 0 |
| | Less than lower limit water level | – | 0 | – |

FIG. 11

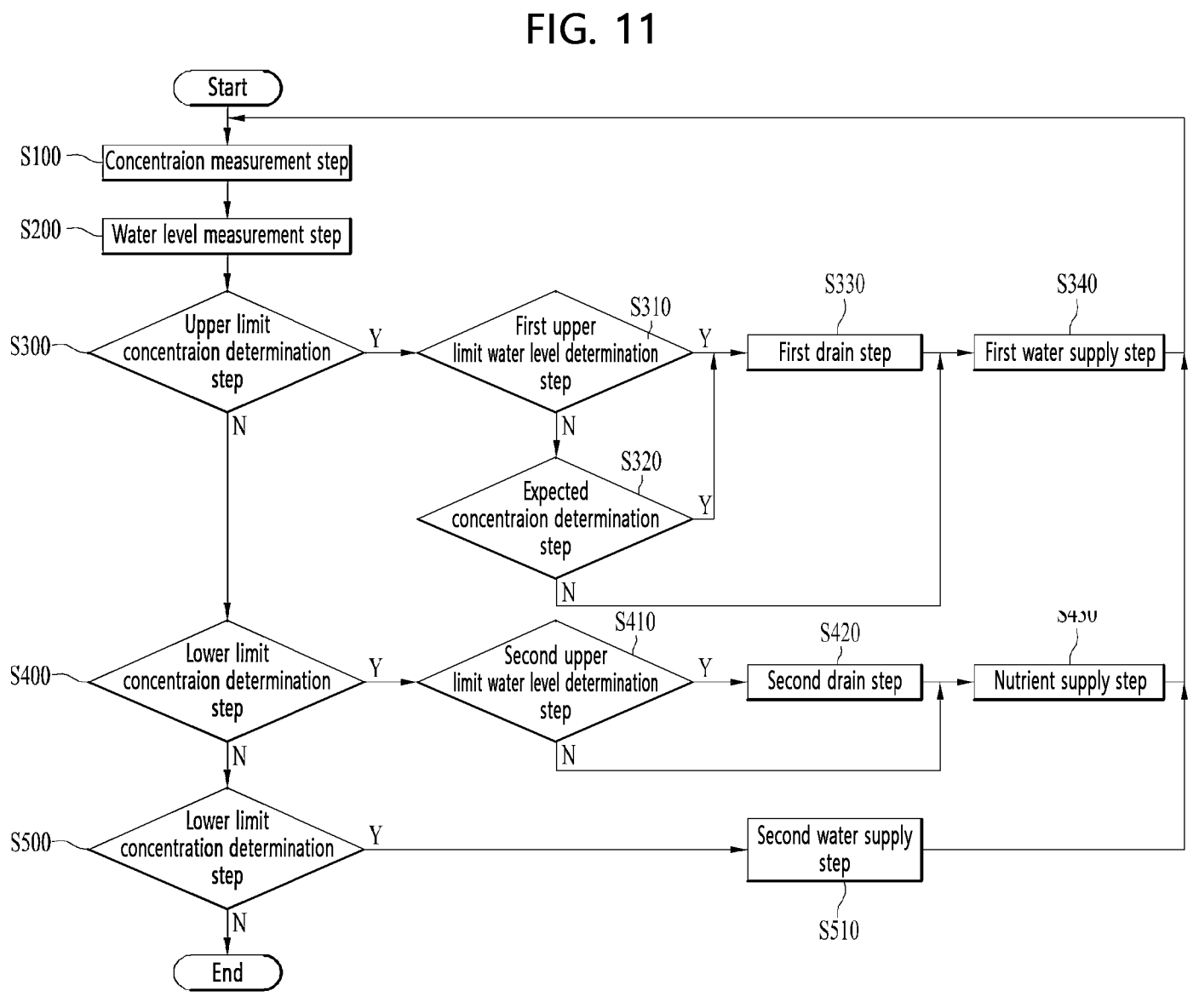

```
Start
  │
  ▼
S100 ── Concentraion measurement step
  │
  ▼
S200 ── Water level measurement step
  │
  ▼
S300 ── Upper limit concentraion determination step
  │ Y                                    N
  ▼
S310 ── First upper limit water level determination step
  │ Y                          N
  │                            ▼
  │          S320 ── Expected concentraion determination step
  │                   Y                      N
  ▼
S330 ── First drain step
  │
  ▼
S340 ── First water supply step S400 ── Lower limit concentraion determination step
  │ Y                                    N
  ▼
S410 ── Second upper limit water level determination step
  │ Y                          N
  ▼
S420 ── Second drain step
  │
  ▼
S430 ── Nutrient supply step S500 ── Lower limit concentration determination step
  │ Y                                    N
  ▼
S510 ── Second water supply step End
```

PLANT CULTIVATION APPARATUS AND CONTROL METHOD FOR SAME

CROSS-REFERENCE TO RELATED PATENT APPLICATIONS

This application is a U.S. National Stage Application under 35 U.S.C. § 371 of PCT Application No. PCT/KR2022/019073, filed Nov. 29, 2022, which claims priority to Korean Patent Application No. 10-2021-0167255, filed Nov. 29, 2021, whose entire disclosures are hereby incorporated by reference.

TECHNICAL FIELD

The present disclosure relates to a plant cultivation apparatus and a method for controlling the same, and to a plant cultivation apparatus capable of providing plants with a nutrient solution mixed with water and nutrients and a method for controlling the same.

BACKGROUND ART

A plant cultivation apparatus refers to a device that enables the cultivation of plants by artificially supplying and controlling the light energy, moisture, soil, temperature, and the like necessary for plant growth. A plant cultivation apparatus includes a cultivation space that creates an environment suitable for plant growth, and plants grow within the cultivation space.

A plant cultivation apparatus may include a component for supplying moisture and nutrients for plant growth, and may also include a component for supplying light energy to the plant. Accordingly, plants may be cultivated in the plant cultivation apparatus even if they are not provided with light from the sun.

The plant cultivation apparatus may include a circulation flow path system for supplying a nutrient solution containing water and nutrients for plant growth to the plants. For example, the nutrient solution may be stored in a mixing tank provided in the plant cultivation apparatus, and after the nutrient solution in the mixing tank is supplied to the plant, the nutrient solution provided to the plant may be recovered and stored in the mixing tank.

On the other hand, it is advantageous for the nutrient solution to have a nutrient concentration and/or pH value suitable for the growth of the plant to create an optimal growth environment for the plant, and the management of the nutrient solution may be accomplished by providing the user with a nutrient solution mixed in an appropriate state in advance or by mixing a certain amount of nutrients with the water provided in the mixing tank.

In relation to this, in reference US 20210144942 A1, a plant cultivation apparatus including a mixing tank in which water and nutrients are mixed is disclosed. In the plant cultivation apparatus in the reference, the user fills the mixing tank with water and then provides a fixed amount of nutrients into the mixing tank from a nutrient supply unit connected to the mixing tank to prepare a nutrient solution.

However, since the plant cultivation apparatus in the reference simply mixes the amount of nutrients set based on the amount of water, it may be disadvantageous in effectively adjusting the concentration of nutrients in the nutrient solution.

Furthermore, if the concentration of the nutrient solution increases by the appropriate level or more during the process of using the nutrient solution, the plant cultivation apparatus in the reference cannot lower the concentration of the nutrient solution, which may be disadvantageous in controlling the concentration of the nutrient solution.

For example, in the circulation process in which the nutrient solution flows out of the mixing tank, is provided to the plants, and is then recovered to the mixing tank, the concentration of the nutrient solution may be increased by the plant's water absorption and soil materials, and when the concentration of the nutrient solution is increased, it may be disadvantageous to lower the appropriate level.

In other words, in the plant cultivation apparatus that provide nutrient solutions to plants, managing the nutrient solution in an optimal state by appropriately controlling the concentration of the nutrient solution or removing bacteria or the like is an important task in this technical field.

DISCLOSURE

Technical Problem

An object of embodiments of the present disclosure is to provide a plant cultivation apparatus that may effectively manage the nutrient solution provided to plants and a method for controlling the same.

In addition, an object of embodiments of the present disclosure is to provide a plant cultivation apparatus that may efficiently manage the concentration of nutrient solution and provide the nutrient solution to plants and a method for controlling the same.

Additionally, an object of embodiments of the present disclosure is to provide a plant cultivation apparatus that may effectively reduce the concentration of nutrient solution and a method for controlling the same.

In addition, an object of embodiments of the present disclosure is to provide a plant cultivation apparatus that may effectively supply and drain water to a mixing tank in which nutrient solution is stored and a method for controlling the same.

In addition, an object of embodiments of the present disclosure is to provide a plant cultivation apparatus that can effectively sterilize a nutrient solution and provide the nutrient solution to plants and a method for controlling the same.

Technical Solution

Embodiments of the present disclosure may manage nutrient solution for optimal growth of crops and suppress the occurrence of green algae and off-flavor in a home plant cultivator based on hydroponics.

The present disclosure may include two or more metering pumps for supplying nutrient solution, one or more tanks, and an EC sensor, and the EC sensor may be used as an EC sensor and a sterilization module according to the applied voltage.

In one embodiment of the present disclosure, the nutrient storage unit where nutrients are stored in liquid form and the mixing tank may operate in conjunction with the state of the nutrient solution stored in the mixing tank. Through this, the nutrient solution management cycle may be extended, and crop growth and hygiene may be improved.

One embodiment of the present disclosure may extend the management cycle of the nutrient solution in the mixing tank of the plant cultivation apparatus as much as possible, even in cases where care service of the plant cultivation apparatus is difficult.

On the other hand, when ultraviolet rays are used to sterilize the nutrient solution in the mixing tank, the sterilization effect may be reduced due to the influence of turbidity of the components of the nutrient solution, and when used for a long time, the sterilization effect may be reduced due to contamination of the ultraviolet lamp tube. In addition, ultraviolet ray treatment may reduce Fe and Mn components in the nutrient solution, which may reduce the growth of crops.

One embodiment of the present disclosure performs sterilization of the nutrient solution by adjusting the voltage of the EC sensor, thereby improving the sterilization effect, preventing beneficial components in the nutrient solution from being destroyed, and improving crop growth.

The plant cultivation apparatus according to an embodiment of the present disclosure includes a cabinet, a mixing tank, a concentration detection unit, a mixing tank water level detection unit, and a control unit.

The mixing tank is provided inside the cabinet and stores a nutrient solution provided to plants by mixing water and nutrients. The concentration detection unit is provided inside the cabinet to measure the concentration of nutrients in the nutrient solution. The mixing tank water level detection unit is provided in the mixing tank to measure the water level of the nutrient solution.

The control unit is configured to determine expected concentration in a state where water is added by the difference between the water level of the nutrient solution and the upper limit water level is determined from the concentration of the nutrient solution when the water level of the nutrient solution is less than the upper limit water level of the mixing tank, and to perform a drain process of draining the nutrient solution from the mixing tank when the expected concentration is at the upper limit or more.

The control unit may be configured to end the drain process when it is determined that the expected concentration is less than the upper limit concentration during the drain process.

The control unit may be configured to perform the drain process when the concentration of the nutrient solution is less than a predetermined lower limit concentration in a state where the water level of the nutrient solution reaches the upper limit water level of the mixing tank.

An embodiment of the present disclosure further includes an output unit provided in the cabinet to output a signal for providing information to the user, in which the control unit may be configured to control the output unit to output a drain request signal requesting the user to drain the mixing tank during the drain process.

An embodiment of the present disclosure further includes an input unit provided in the cabinet to input an operation signal from the user, in which the control unit may be configured to end the drain process when a drain end signal for ending drain of the mixing tank is input from the user through the input unit.

An embodiment of the present disclosure further includes a drain unit provided inside the cabinet and configured to drain the nutrient solution of the mixing tank, in which the control unit may be configured to drain the nutrient solution from the mixing tank through the drain unit during the drain process.

The control unit may be configured to end the drain process when the water level of the nutrient solution in the mixing tank is less than a predetermined reference drainage level during the drain process. The drain unit may include a drain tank in which drain liquid drained from the mixing tank is stored.

An embodiment of the present disclosure further includes a drain tank water level detection unit provided in the drain tank to measure the water level of the drain liquid, in which the control unit may be configured to perform a drain emptying process of discharging the drain liquid to the outside of the drain tank when the water level of the drain liquid reaches the upper limit water level of the drain tank.

The control unit may be configured to control the output unit to output an emptying request signal requesting the user to discharge the drain liquid from the drain tank during the drain tank emptying process.

The control unit may be configured to end the drain tank emptying process when the water level of the drain liquid stored in the drain tank is less than the reference emptying water level of the drain tank during the drain tank emptying process.

The drain unit may discharge the drain liquid discharged from the mixing tank to the outside of the cabinet through a drain flow path extending toward the outside of the cabinet. The control unit may be configured to perform a water supply process of supplying water to the mixing tank when the water level of the nutrient solution is less than the lower limit water level.

An embodiment of the present disclosure further includes a water supply unit provided inside the cabinet and configured to supply water to the mixing tank, in which the control unit may be configured to supply water to the mixing tank through the water supply unit during the water supply process.

The water supply unit may include a water supply tank configured to store water to be supplied to the mixing tank. An embodiment of the present disclosure further includes a water supply tank water level detection unit provided in the water supply tank and configured to measure the water level of the water stored in the water supply tank, in which the control unit may be configured to perform a water supply tank filling process of replenishing water in the water supply tank when the water level stored in the water supply tank reaches the lower limit water level of the water supply tank.

The control unit may be configured to control the output unit to output a filling request signal requesting the user to replenish water in the water supply tank during the water supply tank filling process.

The control unit may be configured to end the water supply tank filling process when the water level stored in the water supply tank is at the reference filling level or more of the water supply tank during the water supply tank filling process.

The water supply unit may supply water delivered through a water supply flow path connected to a water supply source outside the cabinet to the mixing tank. The control unit may be configured to perform a nutrient supply process in which nutrients are provided to the mixing tank when it is determined that the concentration is less than a predetermined lower limit concentration.

An embodiment of the present disclosure further includes a nutrient supply unit provided inside the cabinet and storing the nutrients supplied to the mixing tank, in which the control unit may be configured to supply nutrients to the mixing tank through the nutrient supply unit in the nutrient supply process.

The concentration detection unit may include an EC sensor that measures electrical conductivity of the nutrient solution. The concentration detection unit may measure the concentration of the nutrient solution by applying a first voltage and sterilize the nutrient solution by applying a second voltage higher than the first voltage.

The concentration detection unit may be provided on the outside of the mixing tank, and receive the nutrient solution through a detection flow path through which the nutrient solution provided from the mixing tank flows and measures the concentration.

An embodiment of the present disclosure further includes a cultivation unit provided inside the cabinet and where the plants are placed; a supply flow path extending from the mixing tank toward the cultivation unit, through which the nutrient solution flows, and including a connection unit to which the detection flow path is connected; and a supply pump configured to flow the nutrient solution in the supply flow path, in which the control unit may be configured to control the supply pump to supply the nutrient solution to the cultivation unit or the concentration detection unit.

The connection unit may include a valve unit that allows or blocks the flow of the nutrient solution in the supply flow path and the detection flow path, respectively, and the control unit may be configured to control the valve unit to block the flow of the nutrient solution toward the cultivation unit and allow the flow of the nutrient solution toward the concentration detection unit, thereby performing a nutrient solution management process in which the nutrient solution circulates via the concentration detection unit.

Meanwhile, an embodiment of the present disclosure may include a cabinet, a mixing tank disposed inside the cabinet and configured to store a nutrient solution provided to the plants by mixing water and nutrients, a mixing tank water level detection unit provided in the mixing tank to measure the water level of the nutrient solution, a concentration detection unit provided inside the cabinet to measure the concentration of nutrients in the nutrient solution, and a control unit configured to perform a drain process of draining the nutrient solution from the mixing tank when the concentration of the nutrient solution is less than the predetermined lower limit concentration, in a state where the water level of the nutrient solution reaches the upper limit water level of the mixing tank.

Meanwhile, a method for controlling a plant cultivation apparatus according to an embodiment of the present disclosure may include a water level measurement step of measuring the water level of the nutrient solution stored in a mixing tank to be provided to the plants through a mixing tank water level detection unit provided in the mixing tank; a concentration measurement step of measuring the concentration of the nutrient solution stored in the mixing tank through a concentration detection unit that measures the concentration of nutrients in the nutrient solution; an expected concentration determination step in which the control unit is configured to calculate the amount of water that can be added to the mixing tank from the difference between the water level of the nutrient solution measured in the water level measurement step and the upper limit water level of the mixing tank, and determine the expected concentration at the upper limit water level by reflecting the amount of water that can be added to the mixing tank from the concentration of the nutrient solution measured in the concentration measurement step; an expected concentration determination step in which the control unit is configured to determine whether the expected concentration determined in the expected concentration determination step is at a predetermined upper limit concentration or more; and a drain step in which the control unit is configured to perform a drain process of draining the nutrient solution from the mixing tank when the expected concentration is determined to be the upper limit concentration or more in the expected concentration determination step.

Advantageous Effect

Embodiments of the present disclosure may provide a plant cultivation apparatus that may effectively manage the nutrient solution provided to plants and a method for controlling the same.

In addition, embodiments of the present disclosure may provide a plant cultivation apparatus that can efficiently manage the concentration of nutrient solution and provide the nutrient solution to plants and a method for controlling the same.

Additionally, embodiments of the present disclosure may provide a plant cultivation apparatus that may effectively reduce the concentration of the nutrient solution and a method for controlling the same.

In addition, embodiments of the present disclosure may provide a plant cultivation apparatus that may effectively supply and drain water to a mixing tank in which nutrient solution is stored and a method for controlling the same.

Additionally, embodiments of the present disclosure may provide a plant cultivation apparatus that may effectively sterilize a nutrient solution and provide the nutrient solution to plants and a method for controlling the same.

DESCRIPTION OF DRAWINGS

FIG. 3 is a perspective view illustrating the cultivation space of the plant cultivation apparatus according to an embodiment of the present disclosure.

FIG. 5 is a view schematically illustrating a mixing tank of a plant cultivation apparatus according to an embodiment of the present disclosure.

FIG. 7 is a view conceptually illustrating the flow path of a nutrient solution including a water supply tank and a drain tank in a plant cultivation apparatus according to an embodiment of the present disclosure.

FIG. 8 is a view conceptually illustrating the flow path of the nutrient solution including the water supply unit and drain unit connected to the outside in the plant cultivation apparatus according to an embodiment of the present disclosure.

FIG. 9 is a table illustrating whether the drain process, water supply process, and nutrient supply process are performed according to the state of the nutrient solution in the plant cultivation apparatus according to an embodiment of the present disclosure.

FIG. 11 is a flowchart including an upper limit concentration determination step and a lower limit concentration determination step of the nutrient solution in the method for controlling a plant cultivation apparatus according to an embodiment of the present disclosure.

BEST MODE

Figure 1:
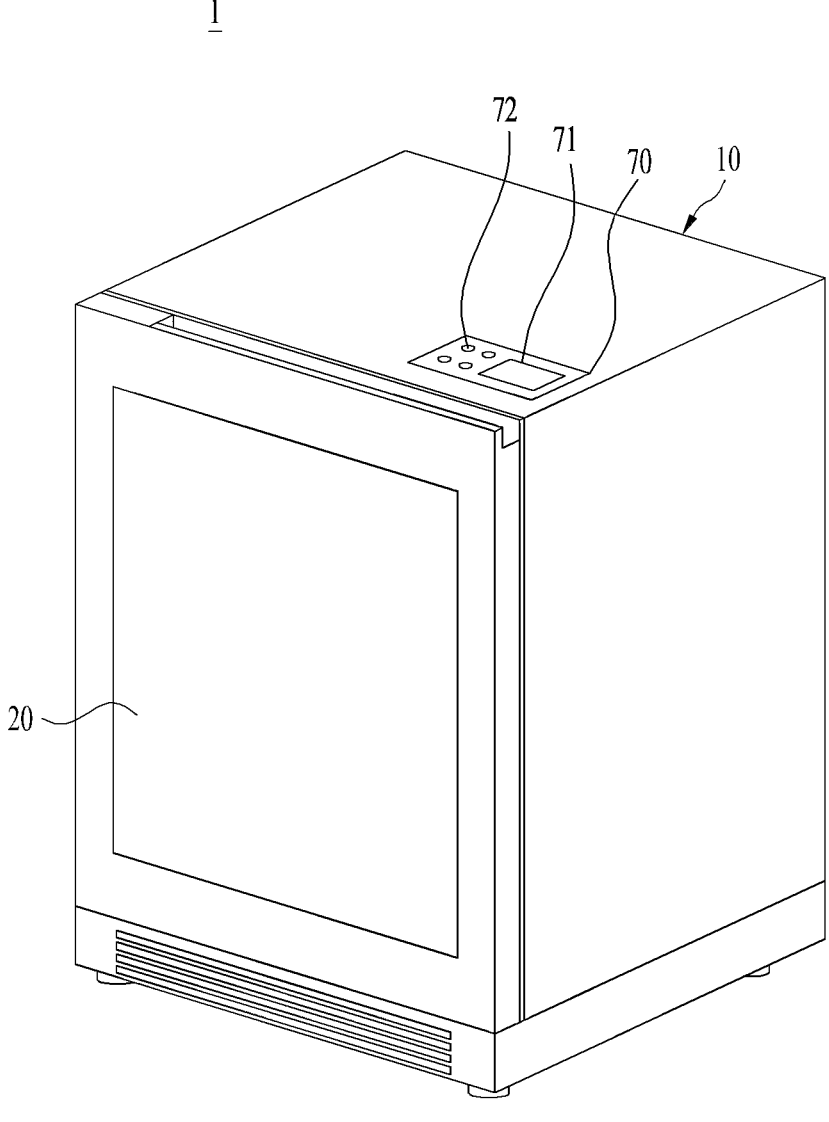
FIG. 1 is a perspective view illustrating the outer appearance of a plant cultivation apparatus according to an embodiment of the present disclosure.

Below, with reference to the attached drawings, embodiments of the present disclosure will be described in detail so that those skilled in the art can easily implement the present disclosure.

However, the present disclosure may be implemented in many different forms and is not limited to the embodiments described herein. In order to clearly explain the present disclosure in the drawings, portions unrelated to the description are omitted, and similar portions are given similar reference numerals throughout the specification.

In this specification, duplicate descriptions of the same components are omitted.

Also, in this specification, when a component is mentioned as being 'connected' or 'joined' to another component, it may be directly connected or joined to the other component, but it should be understood that the other components may exist in between. On the other hand, in this specification, when it is mentioned that a component is 'directly connected' or 'directly joined' to another component, it should be understood that there are no other components in between.

Additionally, the terms used in this specification are merely used to describe specific embodiments and are not intended to limit the present disclosure.

Also, in this specification, singular expressions may include plural expressions, unless the context clearly dictates otherwise.

In addition, in this specification, terms such as 'include' or 'have' are only intended to designate the presence of features, numbers, steps, operations, components, parts, or combinations thereof described in the specification, and it should be understood that this does not exclude in advance the presence or addition of one or more other features, numbers, steps, operations, components, parts, or combinations thereof.

Also, in this specification, the term 'and/or' includes a combination of a plurality of listed items or any of the plurality of listed items. In this specification, 'A or B' may include 'A', 'B', or 'both A and B'.

FIG. 1 illustrates the outer appearance of a plant cultivation apparatus 1 according to an embodiment of the present disclosure. Referring to FIG. 1, a plant cultivation apparatus 1 according to an embodiment of the present disclosure includes a cabinet 10.

The cabinet 10 may include various configurations for placing plants therein and providing light, water, nutrients, or the like to the plants. A cultivation space 15 for plants to grow may be formed inside the cabinet 10.

The cabinet 10 may have various shapes. Although FIG. 1 illustrates a cabinet 10 in the shape of a hexahedron, it is not necessarily limited thereto.

The cabinet 10 has an opening formed on one side so that the cultivation space 15 and the outside may communicate with each other. In other words, the growing space 15 of the cabinet 10 may be exposed to the outside through the opening. The opening may be provided in various positions such as the front surface, the upper surface, and the side, and FIG. 1 illustrates the opening formed on the front surface according to an embodiment of the present disclosure.

Meanwhile, the cabinet 10 may be provided with a door 20 for opening and closing the opening exposing the cultivation space 15 to the outside. The door 20 is coupled to the cabinet 10 and may selectively open or shield the opening.

The door 20 is rotatably provided on the cabinet 10 to open and close the opening of the cabinet 10. For example, the door 20 may be rotated away from the opening to expose the cultivation space 15 of the cabinet 10 to the outside, and may be rotated toward the opening to block the cultivation space 15 from the outside.

Meanwhile, one embodiment of the present disclosure may include a control unit 70. The control unit 70 may include an output unit 71 and an input unit 72. The output unit 71 may generate an output signal to provide information to the user, and the input unit 72 may be operated by the user to generate an input signal.

At least a portion of the control unit 70 may be exposed to the outside of the cabinet 10 to be operated or provide information to the user. FIG. 1 illustrates the control unit 70 provided on the upper surface of the cabinet 10, but the control unit 70 may be located on the side, the front surface, or the inside of the cabinet 10 as needed. Additionally, the input unit 72 and the output unit 71 may be provided at the same location in the cabinet 10, but may also be separated and spaced apart from each other.

Meanwhile, the control unit 70 may be signally/controllably connected to the control unit 80, which will be described later. The output unit 71 of the control unit 70 may be provided to provide visual information, auditory information, or the like to the user according to signals transmitted from the control unit 80, and the input unit 72 may transmit input signals generated by the user to the control unit 80.

Figure 2:
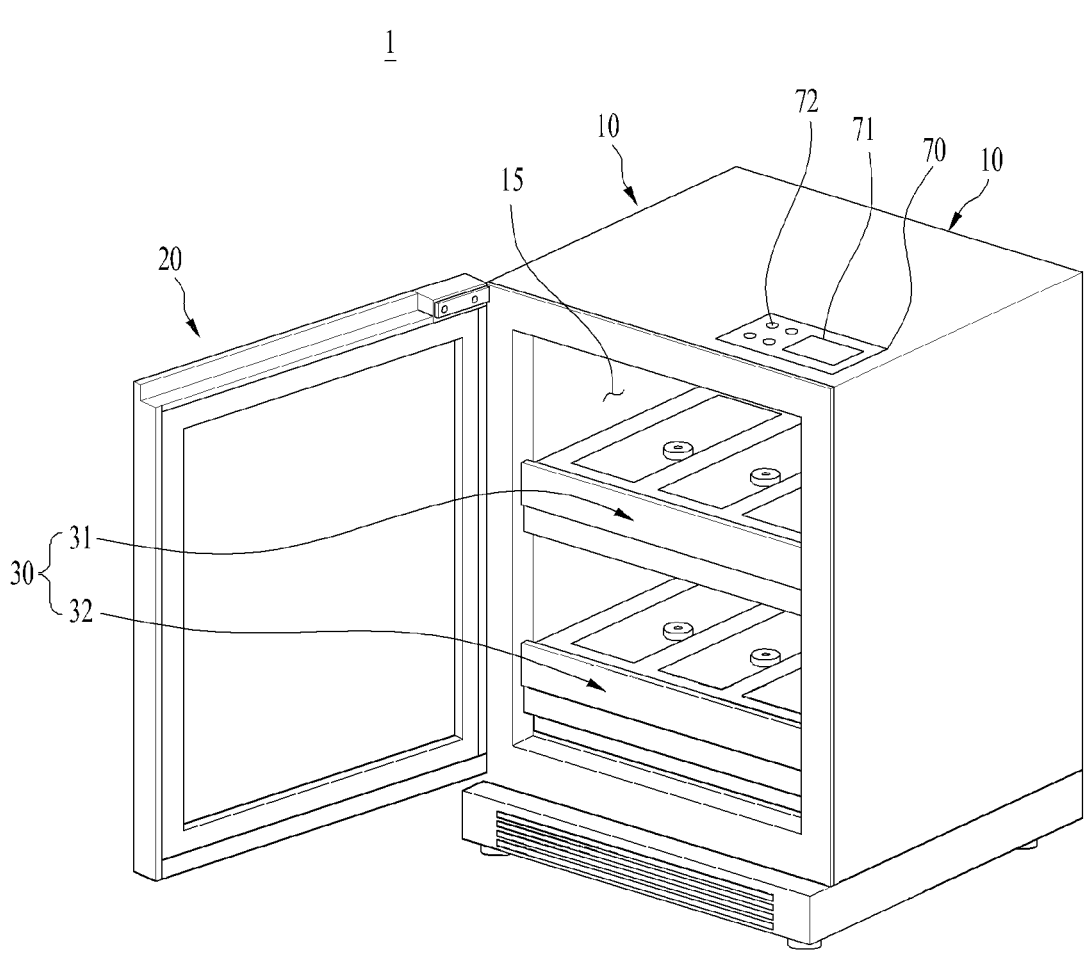
FIG. 2 is a perspective view illustrating a state where the door opens in the plant cultivation apparatus according to an embodiment of the present disclosure.

FIG. 2 illustrates a plant cultivation apparatus 1 according to an embodiment of the present disclosure in which the door 20 is opened and the cultivation space 15 is exposed to the outside.

Referring to FIG. 2, one embodiment of the present disclosure may be provided with a cultivation unit 30 in which plants are placed in a cultivation space 15 defined inside the cabinet 10. The cultivation unit 30 has a shape such as a panel on which plants are seated, and may be provided in plural numbers in a multi-stage form.

Specifically, the cultivation unit 30 may be provided in the shape of a panel parallel to the ground and placed on the cultivation space 15, and may be provided in plural numbers and spaced apart in the vertical direction to form the multi-stage structure.

FIG. 2 illustrates a plant cultivation apparatus 1 including two cultivation units 30 according to an embodiment of the present disclosure, but the number of cultivation units 30 may be determined in various ways according to need.

Figure 3:
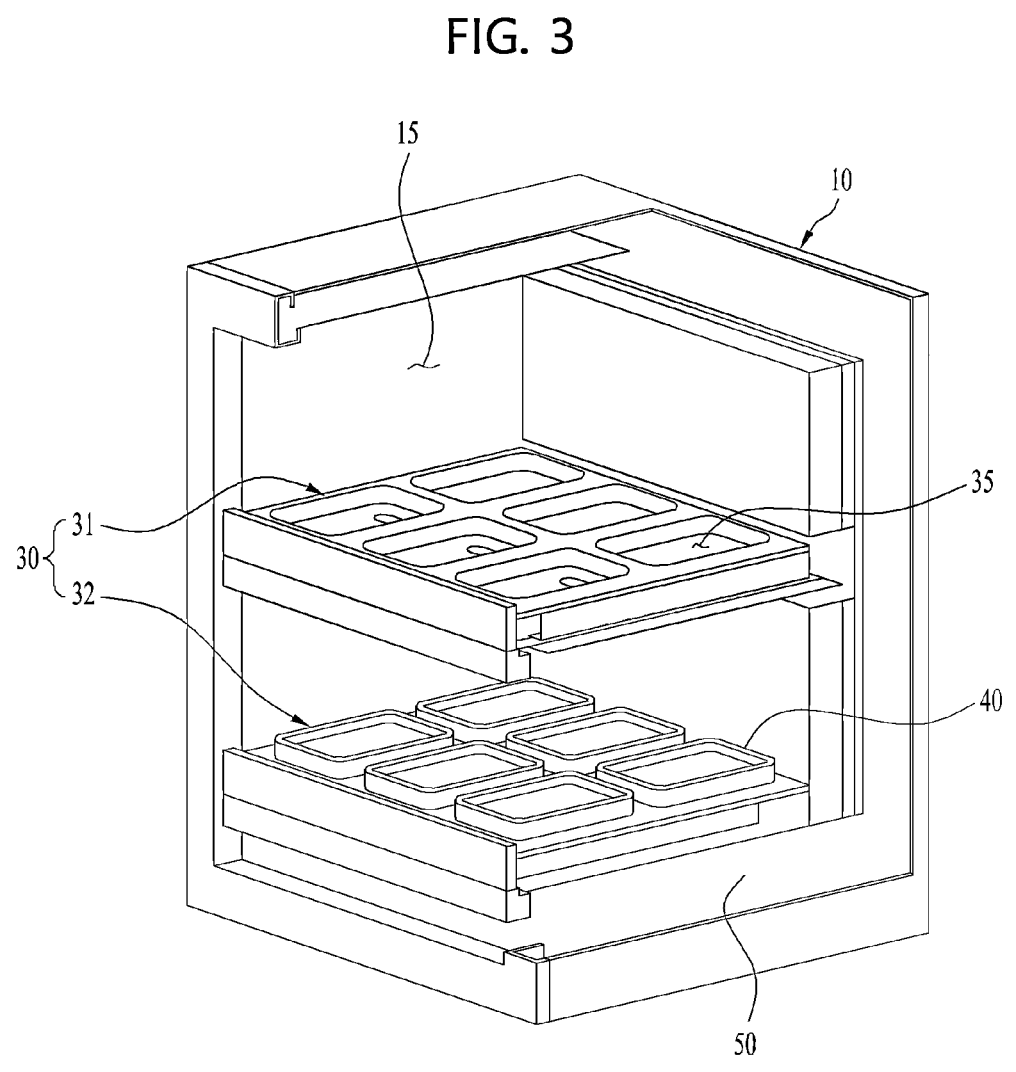

Meanwhile, FIG. 3 illustrates a cultivation space 15 defined inside the plant cultivation apparatus 1 according to an embodiment of the present disclosure.

Referring to FIG. 3, each of the plurality of cultivation units 30 may include a container space 35 in which a cultivation container 40 containing at least a portion of the plant is accommodated. The user may directly place plants in the cultivation unit 30 or insert and install the cultivation container 40 into the container space 35.

In the cultivation unit 30, the container space 35 may be defined through a downwardly recessed groove, and a plurality of container spaces 35 may be provided and spaced apart from each other. FIG. 3 illustrates the container space 35 with the cultivation container 40 removed from the cultivation unit 30 located on the upper side and illustrates a state where the cultivation container 40 is installed in the cultivation unit 30 located on the lower side.

Figure 4:
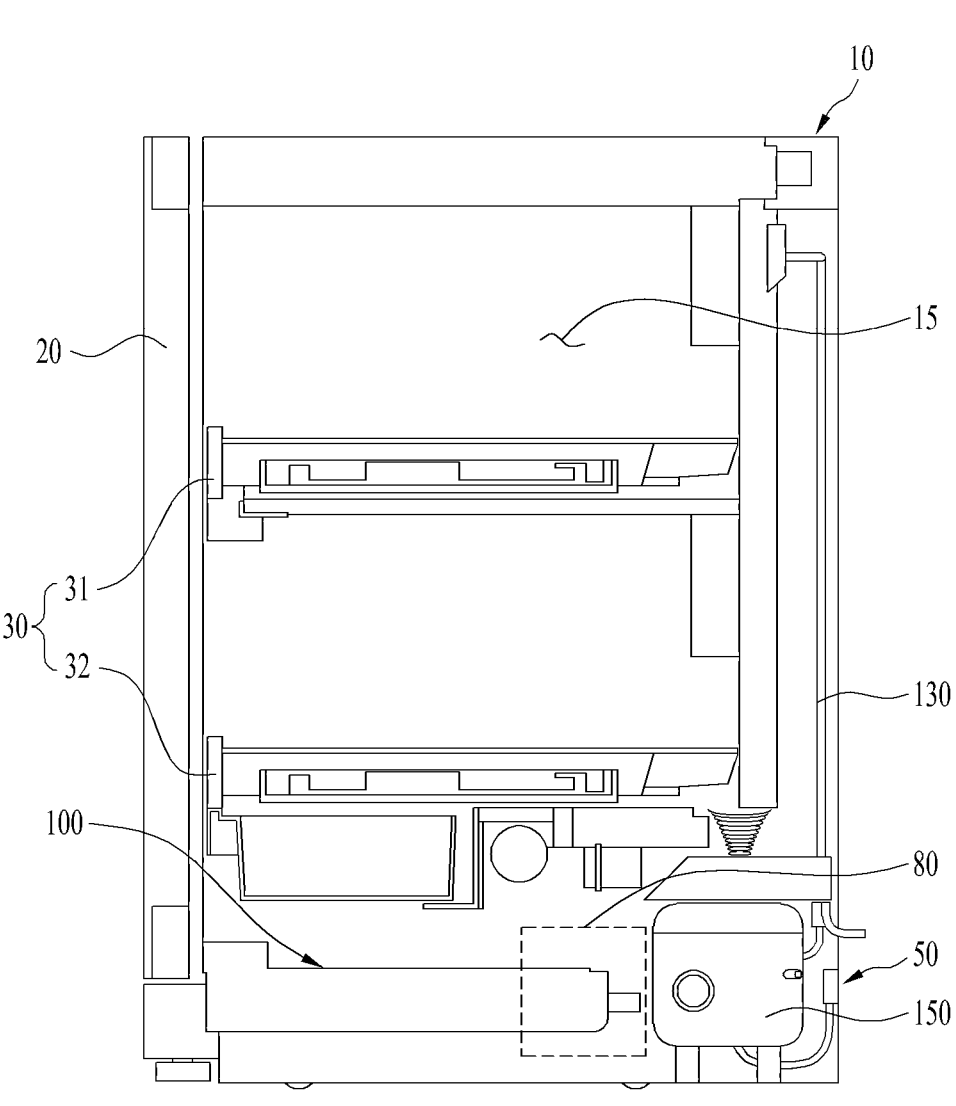
FIG. 4 is a cross-sectional view illustrating the interior of a plant cultivation apparatus according to an embodiment of the present disclosure.

FIG. 4 illustrates a cross-section illustrating the interior of the plant cultivation space 15 according to an embodiment of the present disclosure.

Referring to FIG. 4, the plant cultivation apparatus 1 according to an embodiment of the present disclosure may be separated from the cultivation space 15 where plants grow and may include a machine room 40 including a mixing tank 100, a supply pump 150, which will be described later, and the like.

The location of the machine room 40 may vary, and FIG. 4 illustrates a plant cultivation apparatus 1 in which the machine room 40 with a large load is disposed below the cabinet 10 according to an embodiment of the present disclosure.

The machine room 40 may be equipped with at least a part of a temperature control system or a light quantity control system for controlling the air temperature of the cultivation space 15, in addition to a portion of the circulation supply unit such as the mixing tank 100 and the supply pump 150.

Additionally, one embodiment of the present disclosure may include a control unit 80. In addition to the supply pump 150, the control unit 80 may be signally/electrically connected to various pumps and may control the nutrient solution supply system as well as the temperature control system and light quantity control system.

Figure 5:
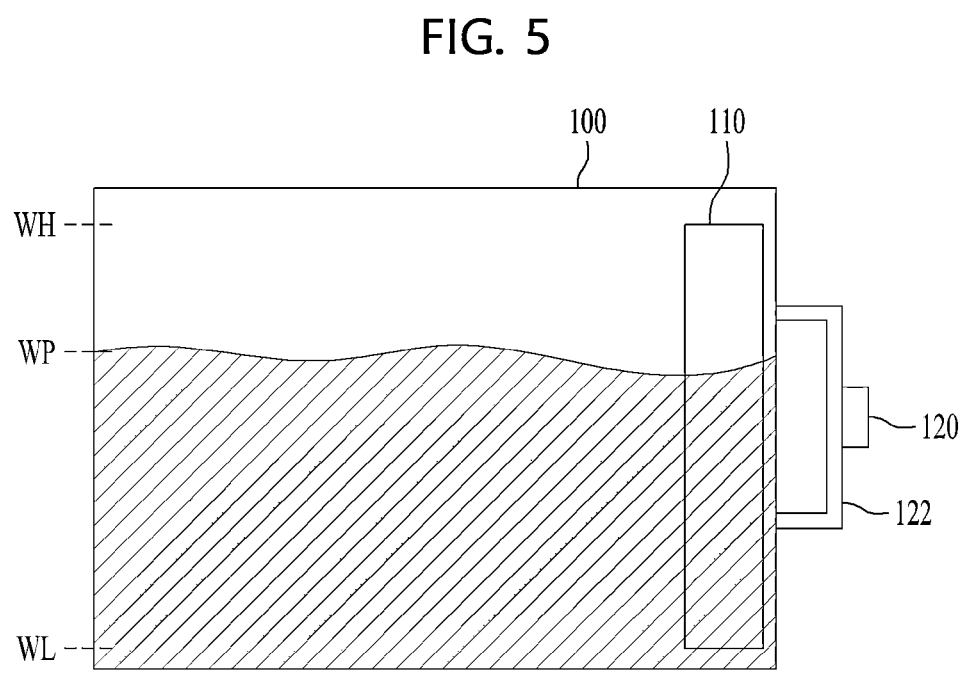

Meanwhile, FIG. 5 conceptually illustrates the structure of the mixing tank 100 according to an embodiment of the present disclosure. In one embodiment of the present disclosure, a nutrient solution in which water and nutrients are mixed may be stored inside the mixing tank 100.

The nutrient solution can be prepared by mixing water and nutrients directly by the user and storing them in the mixing tank 100, or by mixing water and nutrients inside the mixing tank 100. Nutrients may be provided in solid or liquid form. Liquid nutrients may be distinguished from the nutrient solution by their concentration.

The mixing tank 100 may include a mixing tank water level detection unit 110 for measuring the water level WP of the nutrient solution, that is, the amount of the nutrient solution. Additionally, the mixing tank 100 may include a concentration detection unit 120 for measuring the concentration of nutrients in the nutrient solution.

The mixing tank water level detection unit 110 can measure the water level WP of the nutrient solution inside the mixing tank 100, and the control unit 80 may be connected to the mixing tank water level detection unit 110 and may compare the current nutrient solution water level WP with the upper water level WH and lower water limit WL of the mixing tank 100.

The upper water level WH and lower water limit WL of the mixing tank 100 may be determined in consideration of the design characteristics or control strategy aspects of the mixing tank 100 and may be set and stored in advance in the control unit 80.

The concentration detection unit 120 may be placed directly inside the mixing tank 100 or may be provided to measure the concentration of the nutrient solution by receiving the nutrient solution through the detection flow path 122 extending from the mixing tank 100. The control unit 80 is signally connected to the concentration detection unit 120 and may determine the concentration of the nutrient solution through the measured value of the concentration detection unit 120 and utilize this for control.

Figure 6:
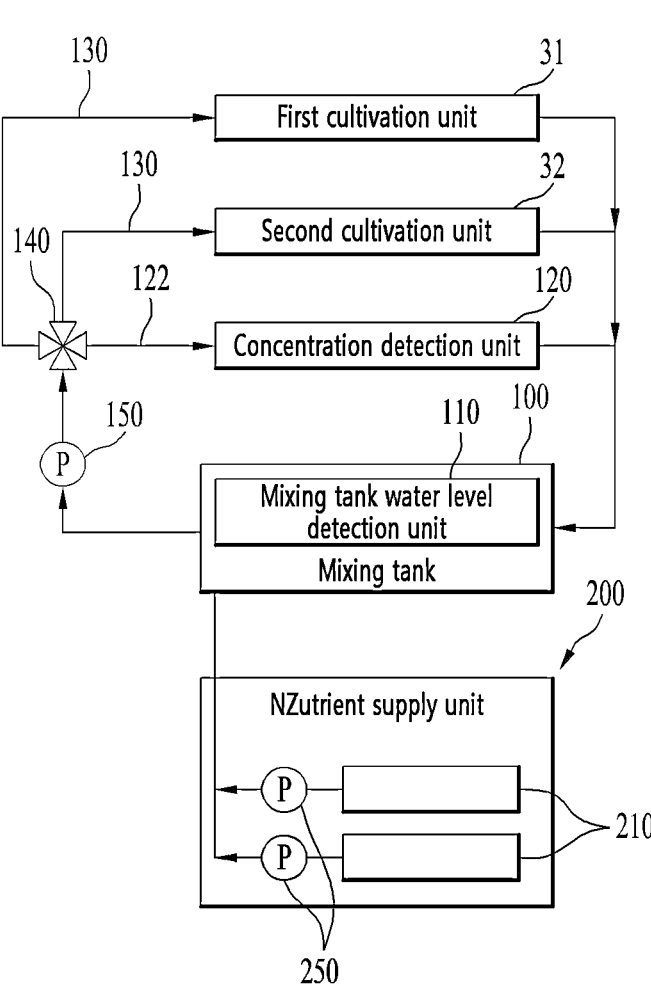
FIG. 6 is a view conceptually illustrating the flow path of the nutrient solution including a mixing tank connected to the nutrient supply unit in the plant cultivation apparatus according to an embodiment of the present disclosure.

Meanwhile, FIG. 6 illustrates a flow path through which the nutrient solution flows from the mixing tank 100 according to an embodiment of the present disclosure. Referring to FIG. 6, the circulation path of the nutrient solution in one embodiment of the present disclosure will be described as follows.

First, a nutrient solution is stored inside the mixing tank 100, and the nutrient solution may be stored directly by the user or formed by mixing water and nutrients within the mixing tank 100. The mixing tank 100 may be connected to a nutrient supply unit 200 that supplies nutrients from the nutrient storage unit 210, where nutrients are stored, into the mixing tank 100 through the nutrient pump 250. However, in one embodiment of the present disclosure, the nutrient supply unit 200 is not necessarily provided, and it is also possible for the user to directly input nutrients into the mixing tank 100.

One embodiment of the present disclosure may include a supply flow path 130 that serves as a path for the nutrient solution flowing from the mixing tank 100 to the cultivation unit 30 where the plants are placed. A supply pump 150 may be provided on the supply flow path 130, and the nutrient solution in the mixing tank 100 may flow along the supply flow path 130 by the supply pump 150.

A valve unit 140 may be provided in the supply flow path 130. The cultivation unit 30 may include a first cultivation unit 31 and a second cultivation unit 32, and the supply flow path 130 may extend toward the first cultivation unit 31 and the second cultivation unit 32, respectively, and the valve unit 140 may be provided at a branch point of the supply flow path 130 to control whether the nutrient solution is supplied to each of the first cultivation unit 31 and the second cultivation unit 32.

In addition, as will be described later, the concentration detection unit 120 provided on the outside of the mixing tank 100 extends from the valve unit 140 and may be provided on a detection flow path 122 in which the flow of nutrient solution is interrupted by the valve unit 140.

One embodiment of the present disclosure may include a recovery flow path connected to the first cultivation unit 31, the second cultivation unit 32, and the detection flow path 122. The nutrient solution provided to the first cultivation unit 31, the second cultivation unit 32, and the detection flow path 122 may flow along the recovery flow path and be recovered back to the mixing tank 100.

Meanwhile, the plant cultivation apparatus 1 according to an embodiment of the present disclosure includes a cabinet 10, a concentration detection unit 120, a mixing tank water level detection unit 110, and a control unit 80, as described above.

The mixing tank 100 is provided inside the cabinet 10 and stores the nutrient solution provided to the plants by mixing water and nutrients. The concentration detection unit 120 is provided inside the cabinet 10 to measure the concentration of nutrients in the nutrient solution. The mixing tank water level detection unit 110 is provided in the mixing tank 100 to measure the water level WP of the nutrient solution.

When the water level WP of the nutrient solution is less than the upper limit water level WH of the mixing tank 100, the control unit 80 determines the expected concentration in the state where water is added by the difference between the water level WP and the upper limit water level WH of the nutrient solution from the concentration of the nutrient solution, and when the expected concentration is at the upper limit concentration or more, a drain process of draining the nutrient solution from the mixing tank 100 is performed.

Specifically, in one embodiment of the present disclosure, the concentration of the nutrient solution stored in the mixing tank 100 may be managed to be suitable for plant growth. The control unit 80 may manage the nutrient solution using the concentration detection unit 120 and the mixing tank water level detection unit 110.

The nutrient solution used for plant growth may have an appropriate range suitable for plant growth. For example, if the concentration of the nutrient solution is too high, abnormal conditions in the plant may occur, and when the concentration of the nutrient solution is too low, plant growth may be delayed.

The appropriate concentration range of the nutrient solution for proper growth of plants may be determined statistically/experimentally or strategically considering the management cycle, and the appropriate concentration range of the nutrient solution, that is, the upper limit concentration and the lower limit concentration of the nutrient solution may be set and stored in advance in the control unit 80.

The upper limit concentration and the lower limit concentration of the nutrient solution may be maintained at predetermined values or may vary according to the growth environment or type of plant. For example, in one embodiment of the present disclosure, the plant or cultivation container 40 may be photographed through a photographing unit or the type of plant may be identified based on the user's input signal, and the upper limit concentration and the lower limit concentration of the nutrient solution may be determined based on the type of plant or the like.

Meanwhile, when the nutrient solution is produced in the mixing tank 100, management of the nutrient solution may be required so that the concentration of the nutrient solution falls within an appropriate range. For example, when the concentration of the nutrient solution is at the upper limit concentration or more, a process of reducing the concentration of the nutrient solution is required.

In particular, as described above, the nutrient solution may have a circulation system in which it is provided to the cultivation unit 30 and then returned to the mixing tank 100, and, in this circulation process of the nutrient solution, the concentration of the nutrient solution may be gradually increased due to the reason that soil materials contained in the medium of the cultivation unit 30 are included in the nutrient solution.

If it is desired to reduce the concentration of the nutrient solution inside the mixing tank 100, water may be replenished to the inside of the mixing tank 100 to reduce the concentration of the nutrient solution. However, even though the nutrient solution in the mixing tank 100 has already reached the upper limit water level WH of the mixing tank 100, or water has been replenished until it reaches the upper limit water level WH of the mixing tank 100, if the concentration of the nutrients is at the upper limit water level WH or more, additional means to reduce the concentration of the nutrient solution may be required.

Accordingly, in one embodiment of the present disclosure, the control unit 80 may be provided to perform a drain process of securing the capacity to replenish water in the mixing tank 100 in order to control the concentration of the nutrient solution to be less than the upper limit water level WH.

In FIG. 9, whether the control unit 80 performs the drain process according to the concentration of the nutrient solution and the level of the nutrient solution in the mixing tank 100 is summarized in a table. FIG. 9 illustrates not only the drain process of the control unit 80, but also the water supply process and nutrient supply process.

Specifically, in one embodiment of the present disclosure, when the concentration of the nutrient solution is at the upper limit concentration or more, the control unit 80 may perform a water supply process of reducing the concentration of the nutrient solution. The water supply process may be automated using a water supply unit 300, which will be described later, or may be performed manually by the user.

When the water level WP of the nutrient solution in the mixing tank 100 corresponds to the upper limit water level WH of the mixing tank 100, the concentration of the nutrient solution, that is, the concentration of nutrients contained in the nutrient solution, is at the predetermined upper limit concentration or more, in order to secure the capacity to replenish water in the mixing tank 100 to reduce the concentration of the nutrient solution, the control unit 80 may perform the drain process of discharging the nutrient solution in the mixing tank 100 to the outside of the mixing tank 100. As will be described later, the drain process may be automated using a drain unit 400 or the like or may be performed manually by the user.

Meanwhile, in one embodiment of the present disclosure, a drain process of lowering the concentration of the nutrient solution may be performed even before the water level WP of the nutrient solution reaches the upper limit water level WH. For example, the control unit 80 may determine the difference between the water level WP and the upper limit water level WH of the nutrient solution, determine the amount of water that may be added to the mixing tank 100 from this, and reflect the amount of water that may be added to calculate the expected concentration of nutrient solution at the upper limit water level WH.

Calculation of the expected concentration may be done by substituting the water level WP of the nutrient solution and the concentration of the nutrient solution into the data map predetermined and stored in the control unit 80, or may also be done in real time from the measured values of the current mixing tank water level detection unit 110 and the concentration detection unit 120.

In one embodiment of the present disclosure, the control unit 80 determines the expected concentration of the nutrient solution assuming that water is replenished up to the upper limit water level WH of the mixing tank 100 in the current state, and when the expected concentration is at the upper limit concentration or more, the drain process may be performed even before the upper limit water level (WH) of the mixing tank 100 is reached.

In other words, in one embodiment of the present disclosure, a situation where the concentration of the nutrient solution cannot be appropriately reduced even if water is replenished up to the upper limit water level WH of the mixing tank 100 is identified using the expected concentration, and by securing additional capacity to replenish water by draining the nutrient solution, it is possible to effectively prevent a situation where meaningless and unnecessary water is replenished in the mixing tank 100.

Meanwhile, in one embodiment of the present disclosure, the control unit 80 may end the drain process if it is determined that the expected concentration is determined to be less than the upper limit concentration during the drain process.

Specifically, as described above, if the current concentration of the nutrient solution is at the upper limit concentration or more and the expected concentration when the mixing tank 100 is replenished to a full water state is also at the upper limit concentration or more, the control unit 80 may perform a drain process of discharging the nutrient solution from the mixing tank 100.

In the drain process, the nutrient solution in the mixing tank 100 may be discharged by using the drain 400, which will be described later, or by the user, and as the nutrient solution is discharged, the amount of water that can be replenished in the mixing tank 100 increases and thus the expected concentration gradually decreases.

In the above drain process, the control unit 80 may terminate the drain process when the expected concentration of the nutrient solution is less than the upper limit concentration in the current state where the nutrient solution is discharged. The end of the drain process may be accomplished by stopping the operation of the drain unit 400 or notifying the user of the end of the drain process through the output unit 71.

Meanwhile, in one embodiment of the present disclosure, in a state where the water level WP of the nutrient solution reaches the upper limit water level WH of the mixing tank 100, when the concentration of the nutrient solution is less than a predetermined lower limit concentration, the control unit 80 may perform the drain process.

In other words, in one embodiment of the present disclosure, as illustrated in the table of FIG. 9, the drain process may be performed even when the concentration of the nutrient solution is at the upper limit concentration or more. In the table of FIG. 9, items marked with "O" mean items that are basically scheduled to be performed under the corresponding conditions, and items marked with "?" mean items that may be optionally performed.

Specifically, when the concentration of the nutrient solution is less than the lower limit concentration, nutrients need to be added to the mixing tank 100 to increase the concentration of the nutrient solution, and water may also be added as needed.

However, in a state where the water level WP of the nutrient solution has already reached the upper limit water level WH of the mixing tank 100, if the concentration of the nutrient solution is less than the lower limit concentration, since there is no additional space for nutrients or nutrients and water to be added to the mixing tank 100, the control unit 80 may perform the nutrient supply process after performing the drain process. At this time, the water supply process may be carried out selectively.

In one embodiment of the present disclosure, the concentration of the nutrient solution may be efficiently managed by performing a drain process not only when the concentration of the nutrient solution is at the upper limit concentration or more, but also when the concentration of the nutrient solution is less than the lower limit concentration.

Meanwhile, an embodiment of the present disclosure may further include the above-described output unit 71, and the output unit 71 may be provided in the cabinet 10 to output a signal for providing information to the user. The control unit 80 may control the output unit 71 to output a drain request signal requesting the user to drain the mixing tank 100 during the drain process.

In other words, in one embodiment of the present disclosure, even if the drain unit 400 is not used, the control unit 80 provides a drain request signal to the user through the output unit 71 to request drain of the mixing tank 100 and thus the drain process may be performed.

The control unit 80 may be provided to provide a drain request signal to the user through the output unit 71 when the drain process is performed, and the drain request signal may be output by the output unit 71 as a signal sound and/or a signal screen, and the user may check the drain request signal and remove the nutrient solution from the mixing tank 100.

Meanwhile, an embodiment of the present disclosure may further include the input unit 72 described above, and the input unit 72 may be provided in the cabinet 10 so that an operation signal may be input from the user. The control unit 80 may end the drain process when a drain end signal for ending drain of the mixing tank 100 is input from the user through the input unit 72.

In other words, the user may discharge the nutrient solution from the mixing tank 100 according to the drain request signal, and when discharge of the nutrient solution is ended, the user may transmit a drain end signal to the control unit 80 through the input unit 72 and the control unit 80 may end the drain process when the drain end signal is received.

After the drain process is ended, as illustrated in the table of FIG. 9, the water supply process, nutrient supply process, or the like is performed as necessary, so that the concentration of the nutrient solution may be adjusted to an appropriate range.

As described above, FIG. 6 illustrates a structure in which the water supply unit 300 and the drain unit 400 are omitted and the mixing tank 100 is supplied and drained by the user. By omitting the water supply unit 300 and the drain unit 400, the plant cultivation apparatus 1 according to an embodiment of the present disclosure has a reduced design space and is advantageous for miniaturization.

Figure 7:
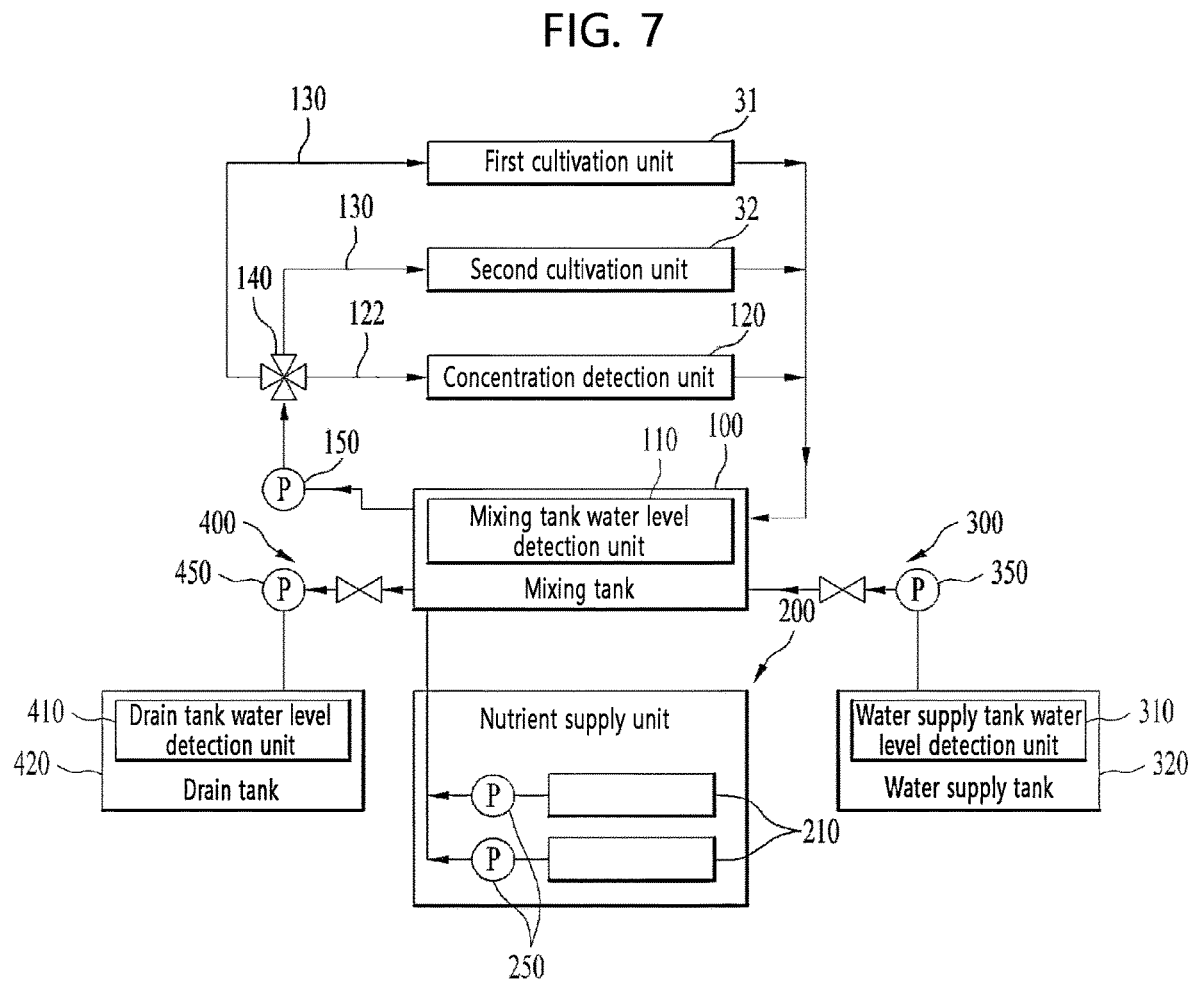
Figure 8:
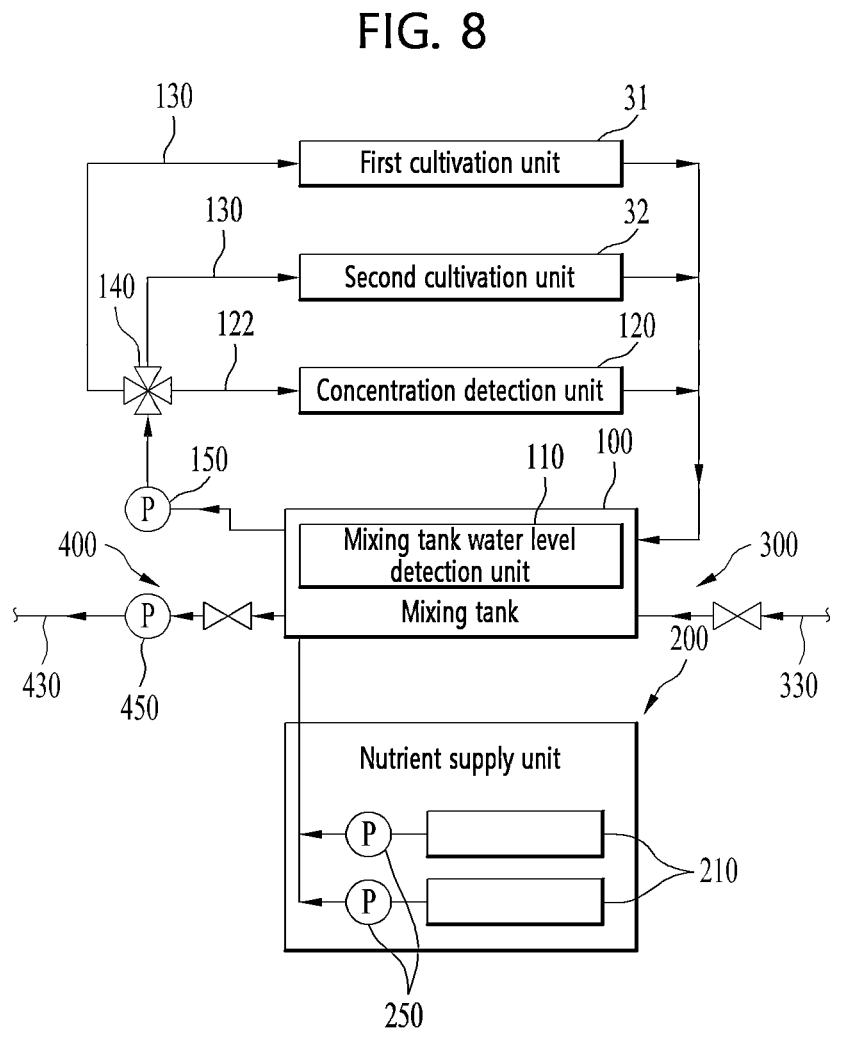

Meanwhile, FIGS. 7 and 8 illustrate a plant cultivation apparatus 1 including a water supply unit 300 and a drain unit 400. Referring to FIGS. 7 and 8, an embodiment of the present disclosure is provided inside the cabinet 10 and further includes a drain unit 400 for draining the nutrient solution of the mixing tank 100, and the control unit 80 may drain the nutrient solution from the mixing tank 100 through the drain unit 400 during the drain process.

In other words, the control unit 80 may perform the drain process considering the concentration of the nutrient solution and the water level WP of the nutrient solution, and in the drain process, the control unit 80 may discharge the nutrient solution from the mixing tank 100 using the drain unit 400.

In one embodiment of the present disclosure, by performing a drain process using the drain unit 400, the drain process of draining the nutrient solution from the mixing tank 100 is automated, thereby improving convenience of use.

Meanwhile, the control unit 80 may end the drain process when the water level WP of the nutrient solution in the mixing tank 100 is less than a predetermined reference drain water level during the drain process.

When the control unit 80 performs a drain process using the drain unit 400, the control unit 80 may end the drain process when the expected concentration of the nutrient solution is less than the upper limit concentration and/or the water level WP of the nutrient solution is less than the reference drain level, as described above.

The reference drain water level is a water level to secure spare capacity in the mixing tank 100 for additional production of a nutrient solution by mixing water and nutrients and may be determined experimentally/statistically and thus be set and stored in advance in the control unit 80.

In addition, the method of ending the drain process through the expected concentration and the method of ending the drain process through the reference drain water level may be used redundantly or selectively as needed.

Meanwhile, FIG. 7 illustrates a drain unit 400 including a drain tank 420 according to an embodiment of the present disclosure. Referring to FIG. 7, in one embodiment of the present disclosure, the drain unit 400 may include a drain tank 420 that stores the drain liquid drained from the mixing tank 100. The drain liquid refers to the nutrient solution discharged from the mixing tank 100.

In other words, the drain unit 400 may store the drain liquid drained from the mixing tank 100 in the drain tank

420, and the drain tank 420 is connected to a drain source located outside the cabinet 10 and thus the drain liquid in the drain tank 420 may be discharged to the outside or directly removed from the drain tank 420 by the user.

In one embodiment of the present disclosure, the drain unit 400 is provided with a drain tank 420, so that the nutrient solution cannot be discharged to the outside of the plant cultivation apparatus 1 during each drain process, thereby improving convenience of use.

In addition, even if the plant cultivation apparatus 1 is placed in a location where there is no drain source outside the cabinet 10 according to the user's convenience, it is advantageous because an automated method of discharging the nutrient solution from the mixing tank 100 through the drain tank 420 may be implemented.

The drain unit 400 may include a drain pump 450 for flowing the drain liquid of the mixing tank 100 to the drain tank 420 or an external drain source, and the control unit 80 may control the drain pump 450 to perform the drain process.

Meanwhile, an embodiment of the present disclosure further includes a drain tank water level detection unit 410 provided in the drain tank 420 to measure the water level of the drain liquid, and when the water level of the drain liquid reaches the upper limit water level of the drain tank 420, the control unit 80 may perform an emptying process of the drain tank 420 to discharge the drain liquid to the outside of the drain tank 420.

In other words, in one embodiment of the present disclosure, the drain liquid discharged from the mixing tank 100 during each drain process may not be discharged outside the cabinet 10, but when the water level of the drain liquid stored in the drain tank 420 reaches the predetermined upper limit water level of the drain tank 420, an emptying process of the drain tank 420 may be performed to remove the drain liquid from the drain tank 420.

Meanwhile, in one embodiment of the present disclosure, the control unit 80 may control the output unit 71 to output an emptying request signal requesting the user to discharge the drain liquid from the drain tank 420 during the emptying process of the drain tank 420.

Specifically, one embodiment of the present disclosure may use an automated method of discharging the drain liquid from the drain tank 420 to the outside of the cabinet 10 through the drain pump 450 or the like during the emptying process of the drain tank 420, or a manual method of discharging the drain liquid from the drain tank 420 directly by the user.

In the case of the manual method, the control unit 80 may transmit an emptying request signal requesting discharge of the drain liquid from the drain tank 420 to the user through the output unit 71 as visual information, auditory information, or the like.

The user may check the emptying request signal and discharge the drain liquid from the drain tank 420. In this case, the user may discharge the drain liquid from the drain tank 420 fixed inside the cabinet 10, or the drain tank 420 may be separated from the cabinet 10 and moved so that the user may empty the drain tank 420.

The emptying process of the drain tank 420 may be ended based on the measured value of the drain tank water level detection unit 410 or a user input signal. When based on the user's input signal, the user can operate the input unit 72 to transmit an emptying end signal to the control unit 80, and the control unit 80 may end the emptying process of the drain tank 420 when the emptying end signal is received. The control unit 80 may be configured to prevent the drain process from being performed before the emptying process of the drain tank 420 is ended.

Meanwhile, in one embodiment of the present disclosure, during the emptying process of the drain tank 420, when the water level of the drain liquid stored in the drain tank 420 is less than the reference emptying level of the drain tank 420, the control unit 80 may also end the emptying process of the drain tank 420.

In other words, the control unit 80 may maintain the emptying process of the drain tank 420 if the water level of the drain liquid is at the reference emptying water level or more during the emptying process of the drain tank 420. The reference emptying water level may be set and stored in advance in the control unit 80 in consideration of convenience of use or the like and may correspond to the water level '0' value.

Meanwhile, FIG. 8 illustrates a structure for discharging drain liquid from the mixing tank 100 to the outside of the cabinet 10 according to an embodiment of the present disclosure. However, even in the case of FIG. 8, it is not excluded that the drain unit 400 includes the drain tank 420.

Referring to FIG. 8, in one embodiment of the present disclosure, the drain unit 400 may discharge the drain liquid discharged from the mixing tank 100 through the drain flow path 430 extending toward the outside of the cabinet 10 outside the cabinet 10.

Specifically, a drain source through which the drain liquid is delivered may be located outside the cabinet 10, and the drain unit 400 may include a drain flow path 430 extending from the mixing tank 100 to the outside of the cabinet 10. When the drain tank 420 is provided, the drain tank 420 may be connected to the drain flow path 430.

In one embodiment of the present disclosure, the drain fluid discharged from the regular mixing tank 100 may be removed from the inside of the cabinet 10 through the drain unit 400 in which the drain flow path 430 extends outside the cabinet 10 and thus an automated system with improved ease of use may be provided.

Meanwhile, in one embodiment of the present disclosure, the control unit 80 may perform a water supply process of supplying water to the mixing tank 100 when the water level WP of the nutrient solution is less than the lower limit water level WL. In the water supply process, water in a state before mixing nutrients may be provided into the mixing tank 100.

Referring to FIGS. 6 and 7, one embodiment of the present disclosure is provided inside the cabinet 10 and may further include a water supply unit 300 that supplies water to the mixing tank 100. The control unit 80 may supply water to the mixing tank 100 through the water supply unit 300 during the water supply process. The water supply unit 300 may include a water supply pump 350 for flowing water into the mixing tank 100.

In one embodiment of the present disclosure, the water supply unit 300 may be provided in various ways. Referring to FIG. 6, in one embodiment of the present disclosure, the water supply unit 300 may include a water supply tank 320 in which water to be supplied to the mixing tank 100 is stored.

In other words, water is stored in the water supply tank 320, and the control unit 80 may supply water into the mixing tank 100 by operating the water supply pump 350 during the water supply process. However, the water supply pump 350 may be omitted according to the water supply method or necessity. For example, the water in the water supply tank 320 may flow by its own weight or by external water pressure when the water supply pump 350 is omitted.

One embodiment of the present disclosure may provide an automated system in which the water supply process may be performed even if the user does not directly supply water into the mixing tank 100 for each water supply process through the water supply unit 300 including the water supply tank 320.

Meanwhile, an embodiment of the present disclosure further includes a water supply tank water level detection unit 310 provided in the water supply tank 320 to measure the water level of the water stored in the water supply tank 320, and when the water level of water stored in the water supply tank 320 reaches the lower limit water level of the water supply tank 320, the control unit 80 may perform a filling process of the water supply tank 320 to replenish water in the water supply tank 320.

During the filling process of the water supply tank 320, water may be replenished to the water supply tank 320 in various ways. For example, the water supply tank 320 may be supplied with water through a water supply source provided outside the cabinet 10, and water may be replenished into the water supply tank 320 by a user.

The water supply tank 320 may be replenished with water while being fixed inside the cabinet 10, or may be separated from the inside of the cabinet 10, be replenished with water, and then provided back inside the cabinet 10.

When water is replenished in the water supply tank 320 by the user, the control unit 80 may control the output unit 71 to output a filling request signal requesting the user to replenish water in the water supply tank 320 during the filling process of the water supply tank 320. The user may add water to the water supply tank 320 by checking the filling request signal.

Additionally, the process of filling the water supply tank 320 may be ended under various conditions. For example, in the process of filling the water supply tank 320, the control unit 80 may transmit a filling request signal to the user, and the user who has replenished the water supply tank 320 may transmit the filling completion signal to the control unit 80 through the input unit 72 and the control unit 80 receiving the filling completion signal may end the water supply tank 320 filling process. The water supply process may be performed after the water supply tank 320 filling process is completed.

Additionally, in one embodiment of the present disclosure, the water supply tank 320 filling process may be ended according to the water level in the water supply tank 320. Specifically, during the filling process of the water supply tank 320, if the level of water stored in the water supply tank 320 is at the reference filling level of the water supply tank 320 or more, the control unit 80 may end the water supply tank 320 filling process.

The reference filling water level may be determined considering ease of use, and may be set and stored in advance in the control unit 80. The control unit 80 may end the water supply tank 320 filling process when the current water level is at the reference filling level or more.

Meanwhile, FIG. 8 illustrates a water supply unit 300 connected to an external water supply source according to an embodiment of the present disclosure. Specifically, the water supply unit 300 may supply water received through a water supply flow path 330 connected to a water supply source outside the cabinet 10 to the mixing tank 100. However, even if the external water supply source and the water supply unit 300 are connected, the water supply tank 320 does not necessarily need to be excluded.

As illustrated in FIG. 8, in one embodiment of the present disclosure, the water supply unit 300 may include a water supply flow path 330 extending outside the cabinet 10. The water supply flow path 330 is connected to a water supply source located outside the cabinet 10, so that water may be supplied from the water supply source.

When the water supply flow path 330 is connected to a water supply source outside the cabinet 10, the water supply pump 350 may be omitted in consideration of the water pressure provided from the water supply source. However, a water supply pump 350 may be added as needed.

One embodiment of the present disclosure includes a water supply unit 300 connected to an external water supply source and a water supply flow path 330, which is advantageous in that water may be supplied in situations where it is needed without limitation during the water supply process.

Meanwhile, as illustrated in the table of FIG. 9, when the control unit 80 determines that the concentration is less than a predetermined lower limit concentration, the control unit may perform a nutrient supply process in which nutrients are provided to the mixing tank 100. The nutrient supply process may be performed by supplying nutrients into the mixing tank 100 by the user, or may be performed automatically through the nutrient supply unit 200 or the like.

Specifically, one embodiment of the present disclosure may further include a nutrient supply unit 200 provided inside the cabinet 10 and storing nutrients supplied to the mixing tank 100. The control unit 80 may supply nutrients to the mixing tank 100 through the nutrient supply unit 200 during the nutrient supply process.

The nutrient supply unit 200 may include a nutrient storage unit 210 in which nutrients are stored and a nutrient pump 250 for flowing the nutrients. When nutrients are provided to the mixing tank 100 through their own weight, the nutrient pump 250 may be omitted.

Meanwhile, as illustrated in FIGS. 6 to 8, the nutrient supply unit 200 may include a plurality of nutrient storage units 210 and a nutrient pump 250. The same or different nutrients may be stored in the plurality of nutrient storage units 210, respectively.

The control unit 80 may check the type and/or growth state of the plant through information input by the user through the input unit 72 or the like or various sensor information that may check the plants in the cultivation space 15, and adjust the type and amount of nutrients according to the type and/or growth condition to provide the nutrients to the mixing tank 100.

For example, the cabinet 10 may include an information code for the cultivation container 40 or a vision sensor that directly photographs plants, and the control unit 80 analyze the photographed image of the vision sensor to determine the type of plant or plant growth condition and the appropriate range of concentration of the nutrient solution may be adjusted or the component ratio may be adjusted accordingly.

Meanwhile, in one embodiment of the present disclosure, the concentration detection unit 120 may include an EC sensor that measures the electrical conductivity of the nutrient solution. In other words, the concentration detection unit 120 may measure the concentration of the nutrient solution based on the current value measured in the nutrient solution when a voltage is generated.

Additionally, in one embodiment of the present disclosure, the concentration detection unit 120 may function as a sterilizing unit for sterilizing the nutrient solution.

For example, the concentration detection unit 120 may measure the concentration of the nutrient solution by applying a first voltage, and sterilize the nutrient solution by applying a second voltage higher than the first voltage.

The first voltage and the second voltage may be set in advance in the control unit 80. The control unit 80 may measure the concentration of the nutrient solution by applying the first voltage to the concentration detection unit 120 in the process of detecting the concentration of the nutrient solution.

Meanwhile, the second voltage may have a higher value than the first voltage, and hypochlorous acid may be generated in the nutrient solution passing through the concentration detection unit 120 to which the second voltage is applied, thereby enabling sterilization.

In other words, one embodiment of the present disclosure not only measures the concentration of the nutrient solution through the concentration detection unit 120, but also performs a sterilization process of the nutrient solution through the concentration detection unit 120, so that the nutrient solution of the mixing tank 100 may be managed in optimal conditions for plant growth.

Referring to FIGS. 6 to 8, in one embodiment of the present disclosure, the concentration detection unit 120 is provided on the outside of the mixing tank 100, and the concentration of the nutrient solution provided in the mixing tank 100 may be measured by receiving the nutrient solution through the detection flow path 122 in which the nutrient solution provided in the mixing tank 100 flows.

In addition, as described above, an embodiment of the present disclosure may further include a cultivation unit 30 provided in the cabinet 10 and where the plants are placed, a supply flow path 130 extending from the mixing tank 100 toward the cultivation unit 30, through which the nutrient solution flows, and including a connection unit to which the detection flow path 122 is connected, and a supply pump 150 which flows the nutrient solution of the supply flow path 130, and the control unit 80 may control the supply pump 150 to supply the nutrient solution to the cultivation unit 30 or the concentration detection unit 120.

In other words, in one embodiment of the present disclosure, the detection flow path 122 connected to the concentration detection unit 120 is connected to the supply flow path 130 for supplying the nutrient solution to the cultivation unit 30, so that, even without a separate pump or the like, the concentration of the nutrient solution flowing along the detection flow path 122 may be detected and sterilized through the supply pump 150 for supplying the nutrient solution to the cultivation unit 30.

Meanwhile, the connection unit includes a valve unit 140 that allows or blocks the flow of the nutrient solution in the supply flow path 130 and the detection flow path 122, respectively, and the control unit 80 may perform a nutrient solution management process in which the nutrient solution circulates via the concentration detection unit 120 by controlling the valve unit 140 so that the flow of the nutrient solution toward the cultivation unit 30 is blocked and the nutrient solution toward the concentration detection unit 120 flows.

The nutrient solution management process may include a concentration detection process and a sterilization process. In other words, one embodiment of the present disclosure may perform efficiently the nutrient solution management process for nutrient solution management since the flowing of the nutrient solution along the detection flow path 122 through the supply pump 150 and simultaneously the supply of the nutrient solution to the cultivation unit 30 through the valve unit 140 may be efficiently blocked.

Furthermore, the supply flow path 130 may include a first supply flow path 130 extending from the valve unit 140 toward the first cultivation unit 31 and a second supply flow path 130 extending from the valve unit 140 toward the second cultivation unit 32, and the valve unit 140 may be provided to control the flow of nutrient solution in each of the first supply flow path 130 and the second supply flow path 130.

In other words, in one embodiment of the present disclosure, if necessary, the nutrient solution may be supplied to the first cultivation unit 31 and the second cultivation unit 32, or the nutrient solution may be supplied to only one of the first cultivation unit 31 and the second cultivation unit 32, and furthermore, the nutrient solution is supplied only to the detection flow path 122 while the nutrient solution is blocked in both the first cultivation unit 31 and the second cultivation unit 32, thereby also performing the nutrient solution management process.

On the other hand, the plant cultivation apparatus 1 according to an embodiment of the present disclosure may include a cabinet 10, a mixing tank 100 disposed inside the cabinet 10 and storing a nutrient solution provided to the plants by mixing water and nutrients, a mixing tank water level detection unit 110 provided in the mixing tank 100 to measure the water level WP of the nutrient solution, a concentration detection unit 120 provided inside the cabinet 10 to measure the concentration of nutrients in the nutrient solution, and a control unit which may perform a drain process of draining the nutrient solution from the mixing tank 100 when the concentration of the nutrient solution is less than the predetermined lower limit concentration, in a state where the water level WP of the nutrient solution reaches the upper limit water level WH of the mixing tank 100.

Meanwhile, the control method for the above-described plant cultivation apparatus 1 will be described below. As for the content already described in the above-described plant cultivation apparatus 1, overlapping explanations will be omitted as much as possible.

Figure 10:
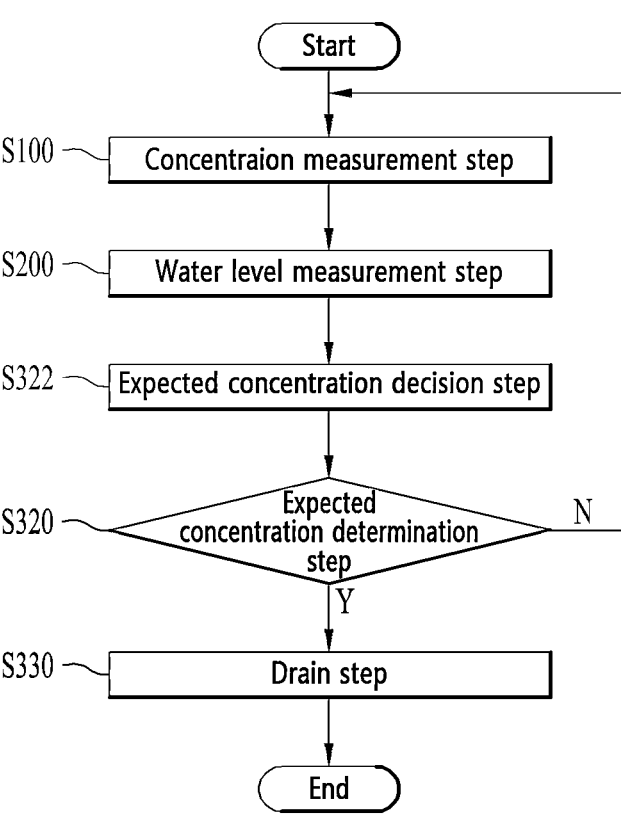
FIG. 10 is a flowchart including an expected concentration determination step in a method for controlling a plant cultivation apparatus according to an embodiment of the present disclosure.

FIG. 10 illustrates a flowchart of a method for controlling the plant cultivation apparatus 1 including the expected concentration determination step S320 of comparing and determining the expected concentration and the upper limit concentration of the nutrient solution according to an embodiment of the present disclosure.

Referring to FIG. 10, the method for controlling a plant cultivation apparatus 1 according to an embodiment of the present disclosure may include a water level measurement step S200, a concentration measurement step S100, an expected concentration decision step S322, and an expected concentration determination step. S320, and a drain step.

Specifically, in the water level measurement step S200, the control unit 80 may measure the water level WP of the nutrient solution stored in the mixing tank 100 to be provided to the plants through the mixing tank water level detection unit 110 provided in the mixing tank 100.

In the concentration measurement step S100, the control unit 80 may measure the concentration of the nutrient solution stored in the mixing tank 100 through the concentration detection unit 120, which measures the concentration of nutrients in the nutrient solution. In FIG. 10, the water level measurement step S200 is illustrated after the concentration measurement step S100, but this does not present the precedence of each step, and the water level measurement step S200 may be performed before the concentration measurement step S100 or both may be performed simultaneously.

In the expected concentration decision step (S322), the control unit 80 may calculate the amount of water that may be added to the mixing tank 100 based on the difference between the water level WP of the nutrient solution measured in the water level measurement step S200 and the upper limit water level WH of the mixing tank 100, and may determine the expected concentration at the upper limit water level WH by reflecting the amount of water that may be added to the mixing tank 100 from the concentration of the nutrient solution measured in the concentration measurement step S100.

In the expected concentration determination step S320, the control unit 80 may determine whether the expected concentration determined in the expected concentration decision step S322 is at a predetermined upper limit concentration or more. In the expected concentration determination step S320, if the expected concentration is determined at the upper limit concentration or more, the control unit 80 may perform a drain step of draining the nutrient solution from the mixing tank 100.

Meanwhile, FIG. 11 illustrates a flow chart of the method for controlling the plant cultivation apparatus 1 for managing the nutrient solution, including the expected concentration determination step S320. The method for controlling a plant cultivation apparatus 1 according to an embodiment of the present disclosure will be described with reference to FIG. 11 as follows.

In the concentration measurement step S100, the control unit 80 may measure the concentration of the nutrient solution stored in the mixing tank 100 through the concentration detection unit 120, and in the water level measurement step S200, the control unit 80 may measure the water level WP of the nutrient solution stored in the mixing tank 100 through the mixing tank water level detection unit 110.

In the upper limit concentration determination step S300, the control unit 80 may determine whether the concentration of the nutrient solution is at the predetermined upper limit concentration or more. If the concentration of the nutrient solution is at the upper limit concentration or more, the first upper limit water level determination step S310 may be performed.

In the first upper water level determination step S310, the control unit 80 determines whether the water level WP of the nutrient solution is at the predetermined upper water level WH or more, and if the water level WP of the nutrient solution is at the upper limit water level WH or more, the first drain step S330 and the first water supply step S340 may be performed.

In the first drain step S330, the control unit 80 may perform a drain process of discharging the nutrient solution from the mixing tank 100, and in the first water supply step S340, the control unit 80 may perform a drain process of supplying water to the mixing tank 100.

Meanwhile, in the first upper limit water level determination step S310, if the water level WP of the nutrient solution is less than the upper limit water level WH, the expected concentration determination step S320 may be performed. In the expected concentration determination step S320, the control unit 80 may determine whether the expected concentration of the nutrient solution is at the upper limit concentration or more, and if the expected concentration is at the upper limit concentration or more, the first drain step S330 and the first water supply step S340 may be performed, and if the expected concentration is less than the upper limit concentration, only the first water supply step S340 may be performed.

Meanwhile, if the concentration of the nutrient solution is less than the upper limit concentration in the upper limit concentration determination step S300, the lower limit concentration determination step S400 may be performed. In the lower limit concentration determination step S400, the control unit 80 may determine whether the concentration of the nutrient solution is less than the predetermined lower limit concentration.

If the concentration of the nutrient solution is less than the lower limit concentration in the lower limit concentration determination step S400, the second upper limit water level determination step S410 may be performed. In the second upper limit water level determination step S410, the control unit 80 determines whether the water level WP of the nutrient solution is at the predetermined upper limit water level WH or more, and if the water level WP of the nutrient solution is at the upper limit water level WH, the second drain step S420 and the nutrient supply step S430 may be performed.

In the second drain step S420, the control unit 80 may perform a drain process of discharging the nutrient solution from the mixing tank 100, and in the nutrient supply step S430, the control unit 80 may perform a nutrient supply process of supplying nutrients.

In the second upper limit water level determination step S410, if the water level WP of the nutrient solution is determined to be less than the upper water limit WH, only the nutrient supply step S430 may be performed except the second drain step S420.

Meanwhile, in the lower limit concentration determination step S400, if the concentration of the nutrient solution is determined to be at the lower limit concentration or more, the lower limit water level determination step S500 may be performed. In the lower limit water level determination step S500, the control unit 80 may determine whether the water level WP of the nutrient solution is less than the predetermined lower limit water level WL.

The lower water level WL may be set and stored in advance in the control unit 80, and may correspond to the minimum amount of nutrient solution appropriate for supplying the nutrient solution to the cultivation unit 30.

In the lower limit water level determination step S500, if the water level WP of the nutrient solution is determined to be less than the lower limit water level WL, the second water supply step S510 may be performed, and the control unit 80 may perform a water supply process of supplying water to the mixing tank 100 in the second water supply step S510. After the second water supply step S510, the control unit 80 may additionally perform a nutrient supply process considering the concentration of the nutrient solution.

Although the present disclosure has been illustrated and described in relation to specific embodiments, it will be apparent to those skilled in the art that the present disclosure may be improved and changed in various ways, without departing from the technical spirit of the disclosure as provided by the following claims.

What is claimed is:

1. A plant cultivation apparatus comprising:
a cabinet;
a mixing tank provided inside the cabinet and configured to store a nutrient solution provided to plants by mixing water and nutrients;
a concentration detection unit provided inside the cabinet and configured to measure a concentration of nutrients in the nutrient solution;

a mixing tank water level detection unit provided in the mixing tank and configured to measure a water level of the nutrient solution; and a control unit configured to determine expected concentration based on the concentration of the nutrient solution when the water level of the nutrient solution is less than an upper limit water level of the mixing tank, the expected concentration being calculated assuming that water is added to the nutrient solution until the water level reaches the upper limit water level, and to perform a drain process of draining the nutrient solution from the mixing tank when the expected concentration is at the upper limit or more.

2. The plant cultivation apparatus of claim 1, wherein the control unit is configured to end the drain process when it is determined that the expected concentration is less than the upper limit concentration during the drain process.

3. The plant cultivation apparatus of claim 1, wherein the control unit is configured to perform the drain process when the concentration of the nutrient solution is less than a predetermined lower limit concentration in a state where the water level of the nutrient solution reaches the upper limit water level of the mixing tank.

4. The plant cultivation apparatus of claim 1, further comprising:

an output unit provided in the cabinet to output a signal for providing information to a user, wherein the control unit is configured to control the output unit to output a drain request signal requesting the user to drain the mixing tank during the drain process.

5. The plant cultivation apparatus of claim 4, further comprising:

an input unit provided in the cabinet to input an operation signal from the user, wherein the control unit is configured to end the drain process when a drain end signal for ending draining of the mixing tank is input from the user through the input unit.

6. The plant cultivation apparatus of claim 1, further comprising:

a drain unit provided inside the cabinet and configured to drain the nutrient solution of the mixing tank, wherein the control unit is configured to drain the nutrient solution from the mixing tank through the drain unit during the drain process.

7. The plant cultivation apparatus of claim 6, wherein the control unit is configured to end the drain process when the water level of the nutrient solution in the mixing tank is less than a predetermined reference drainage level during the drain process.

8. The plant cultivation apparatus of claim 6, wherein the drain unit includes a drain tank in which drain liquid drained from the mixing tank is stored.

9. The plant cultivation apparatus of claim 8, further comprising:

a drain tank water level detection unit provided in the drain tank and configured to measure a water level of the drain liquid, wherein the control unit is configured to perform a drain tank emptying process of discharging the drain liquid to outside of the drain tank when the water level of the drain liquid reaches an upper limit water level of the drain tank.

10. The plant cultivation apparatus of claim 9, further comprising:

an output unit provided in the cabinet to output a signal for providing information to a user, wherein the control unit is configured to control the output unit to output an emptying request signal requesting the user to discharge the drain liquid from the drain tank during the drain tank emptying process.

11. The plant cultivation apparatus of claim 9, wherein the control unit is configured to end the drain tank emptying process when the water level of the drain liquid stored in the drain tank is less than a reference emptying water level of the drain tank during the drain tank emptying process.

12. The plant cultivation apparatus of claim 6, wherein the drain unit discharges the drain liquid discharged from the mixing tank to outside of the cabinet through a drain flow path extending toward the outside of the cabinet.

13. The plant cultivation apparatus of claim 6, further comprising:

an output unit provided in the cabinet to output a signal for providing information to a user, wherein the control unit is configured to control the output unit to output a filling request signal requesting the user to replenish water in the water supply tank during the water supply tank filling process.

14. The plant cultivation apparatus of claim 1, wherein the control unit is configured to perform a water supply process of supplying water to the mixing tank when the water level of the nutrient solution is less than a lower limit water level.

15. The plant cultivation apparatus of claim 14, further comprising:

a water supply unit provided inside the cabinet and configured to supply water to the mixing tank, wherein the control unit is configured to supply water to the mixing tank through the water supply unit during the water supply process.

16. The plant cultivation apparatus of claim 15, wherein the water supply unit includes a water supply tank configured to store water to be supplied to the mixing tank.

17. The plant cultivation apparatus of claim 16, further comprising:

a water supply tank water level detection unit provided in the water supply tank and configured to measure a water level of the water stored in the water supply tank, wherein the control unit is configured to perform a water supply tank filling process of replenishing water in the water supply tank when the water level stored in the water supply tank reaches the lower limit water level of the water supply tank.

18. The plant cultivation apparatus of claim 17, wherein the control unit is configured to end the water supply tank filling process when the water level stored in the water supply tank is at a reference filling level or more of the water supply tank during the water supply tank filling process.

19. The plant cultivation apparatus of claim 15, wherein the water supply unit supplies water delivered through a water supply flow path connected to a water supply source provided outside the cabinet to the mixing tank.

20. The plant cultivation apparatus of claim 1, wherein the control unit is configured to perform a nutrient supply process in which nutrients are provided to the mixing tank when it is determined that the concentration is less than a predetermined lower limit concentration.

21. The plant cultivation apparatus of claim 20, further comprising:

a nutrient supply unit provided inside the cabinet and configured to store the nutrients supplied to the mixing tank, wherein the control unit is configured to supply nutrients to the mixing tank through the nutrient supply unit in the nutrient supply process.

22. The plant cultivation apparatus of claim 1, wherein the concentration detection unit includes an EC sensor configured to measure electrical conductivity of the nutrient solution.

23. The plant cultivation apparatus of claim 22, wherein the concentration detection unit is configured to measure the concentration of the nutrient solution by applying a first voltage and is configured to sterilize the nutrient solution by applying a second voltage higher than the first voltage.

24. The plant cultivation apparatus of claim 1, wherein the concentration detection unit is provided on the outside of the mixing tank, is configured to receive the nutrient solution through a detection flow path through which the nutrient solution provided from the mixing tank flows, and is configured to measure the concentration.

25. The plant cultivation apparatus of claim 24, further comprising:

a cultivation unit provided inside the cabinet and where the plants are placed;

a supply flow path extending from the mixing tank toward the cultivation unit, through which the nutrient solution flows, and including a connection unit to which the detection flow path is connected; and a supply pump configured to flow the nutrient solution in the supply flow path, wherein the control unit is configured to control the supply pump to supply the nutrient solution to the cultivation unit or the concentration detection unit.

26. The plant cultivation apparatus of claim 25, wherein the connection unit includes a valve unit that is configured to control a flow of the nutrient solution in the supply flow path and the detection flow path, respectively, and wherein the control unit is configured to control the valve unit to block the flow of the nutrient solution toward the cultivation unit and allow the flow of the nutrient solution toward the concentration detection unit, thereby performing a nutrient solution management process in which the nutrient solution circulates via the concentration detection unit.

27. A method for controlling a plant cultivation apparatus comprising:

a water level measurement step of measuring a water level of a nutrient solution stored in a mixing tank to be provided to plants through a mixing tank water level detection unit provided in the mixing tank;

a concentration measurement step of measuring a concentration of the nutrient solution stored in the mixing tank through a concentration detection unit that is configured to measure the concentration of nutrients in the nutrient solution;

an expected concentration decision step in which a control unit is configured to calculate an expected concentration based on the concentration of the nutrient solution measured in the concentration measurement step, the expected concentration being calculated assuming that water is added to the nutrient solution until the water level reaches an upper limit water level of the mixing tank when the water level measured in the water level measurement step is less than the upper limit water level;

an expected concentration determination step in which the control unit is configured to determine whether the expected concentration determined in the expected concentration decision step is at a predetermined upper limit concentration or more; and a drain step in which the control unit is configured to perform a drain process of draining the nutrient solution from the mixing tank when the expected concentration is determined to be the upper limit concentration or more in the expected concentration determination step.

* * * * *